Dec. 10, 1940.　　　W. S. AUSTIN　　　2,224,717
SPRING SUSPENSION FOR VEHICLES
Filed March 28, 1938　　　8 Sheets-Sheet 1

INVENTOR.
WALTER S. AUSTIN.
BY Thomas G. Boman.
ATTORNEY.

INVENTOR.
WALTER S. AUSTIN
BY Thomas G. Boman,
ATTORNEY.

Dec. 10, 1940.    W. S. AUSTIN    2,224,717
SPRING SUSPENSION FOR VEHICLES
Filed March 28, 1938    8 Sheets-Sheet 3
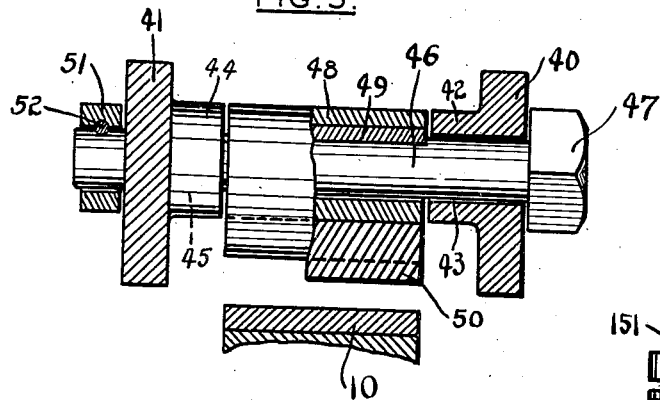
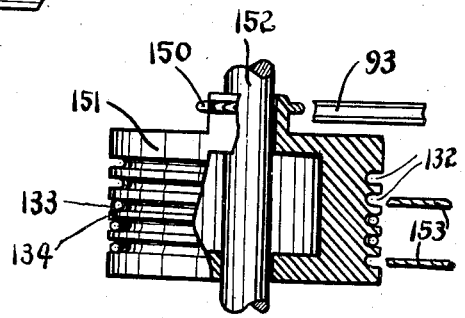
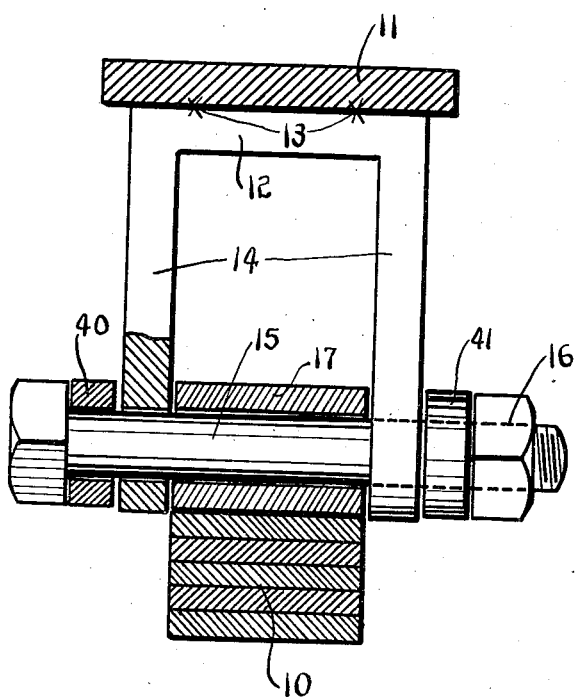
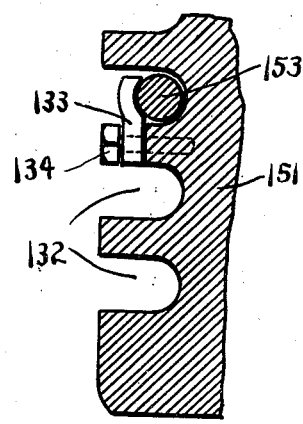
INVENTOR.
WALTER S. AUSTIN.
BY Thomas G. Boman,
ATTORNEY.

Dec. 10, 1940.   W. S. AUSTIN   2,224,717
SPRING SUSPENSION FOR VEHICLES
Filed March 28, 1938   8 Sheets-Sheet 4

INVENTOR.
WALTER S. AUSTIN
BY Thomas G. Boman.
ATTORNEY.

Dec. 10, 1940.    W. S. AUSTIN    2,224,717
SPRING SUSPENSION FOR VEHICLES
Filed March 28, 1938    8 Sheets-Sheet 5

INVENTOR.
WALTER S. AUSTIN.
BY Thomas G. Boman.
ATTORNEY.

Dec. 10, 1940.  W. S. AUSTIN  2,224,717
SPRING SUSPENSION FOR VEHICLES
Filed March 28, 1938  8 Sheets-Sheet 6
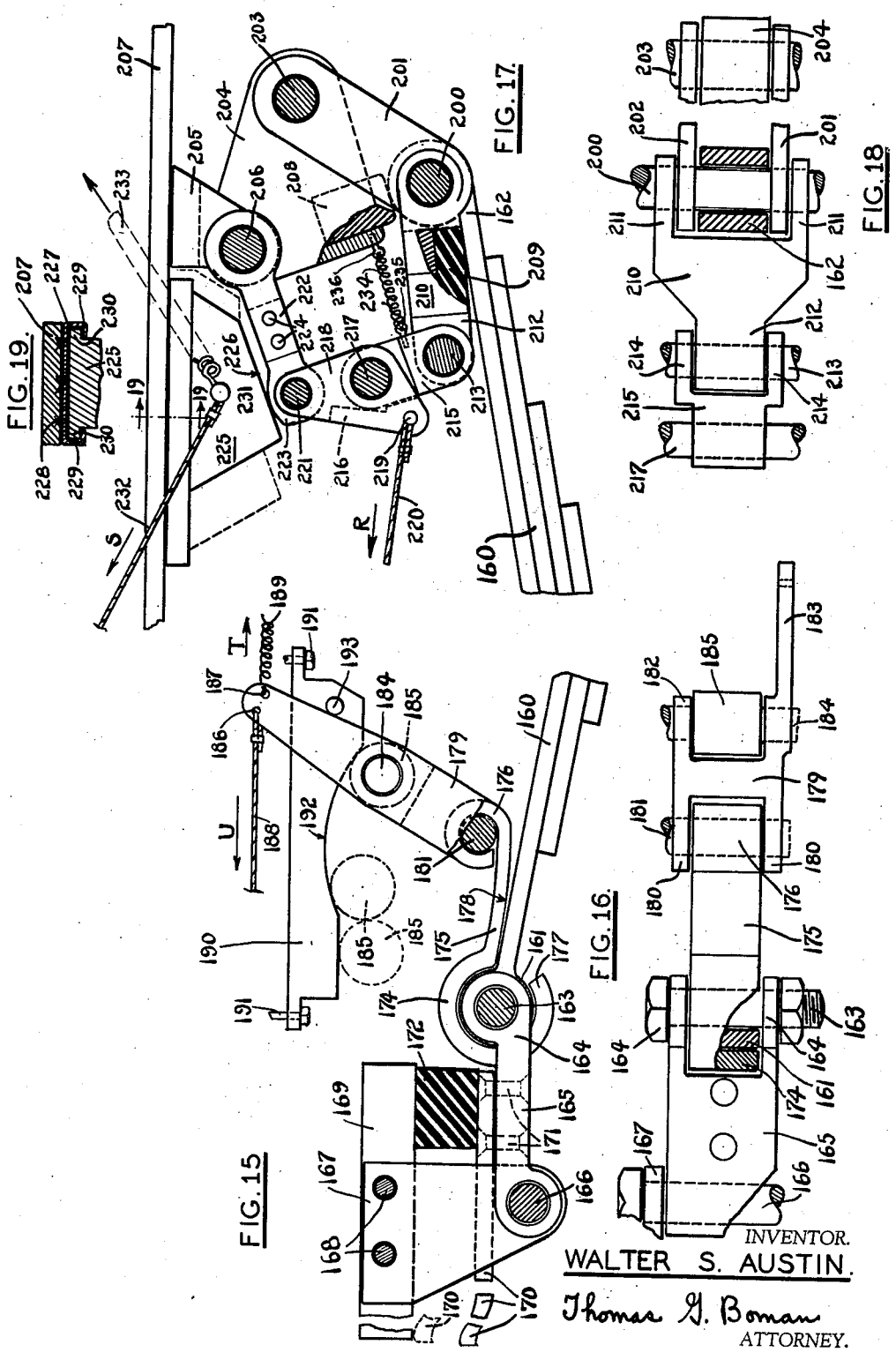
INVENTOR.
WALTER S. AUSTIN.
Thomas G. Boman
ATTORNEY.

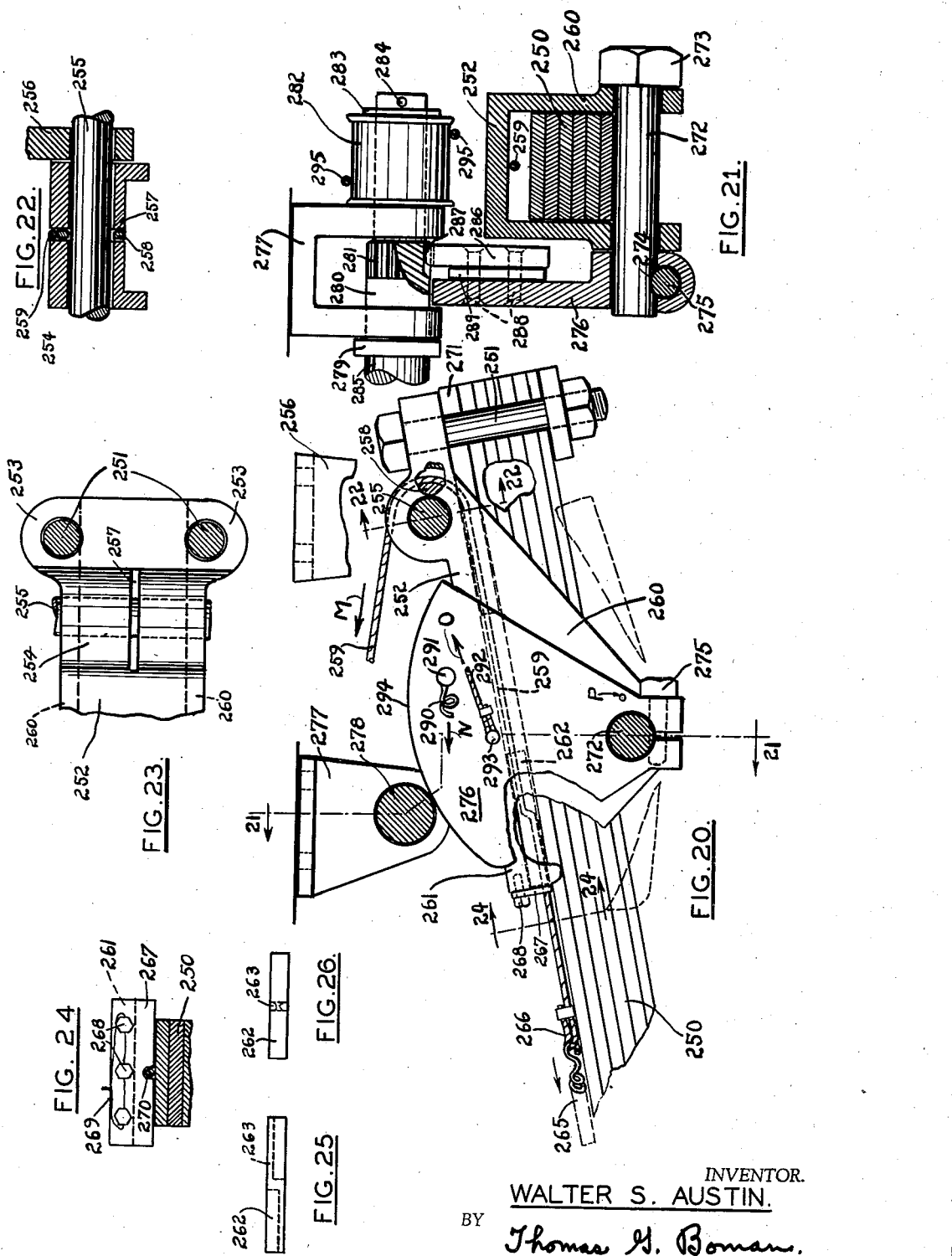

Dec. 10, 1940.  W. S. AUSTIN  2,224,717
SPRING SUSPENSION FOR VEHICLES
Filed March 28, 1938    8 Sheets-Sheet 8

INVENTOR.
WALTER S. AUSTIN.
BY Thomas G. Boman.
ATTORNEY.

Patented Dec. 10, 1940

2,224,717

UNITED STATES PATENT OFFICE 2,224,717

SPRING SUSPENSION FOR VEHICLES

Walter S. Austin, Grand Rapids, Mich.

Application March 28, 1938, Serial No. 198,465

10 Claims. (Cl. 267—41)

My invention relates generally to vehicle springs and more particularly to means for varying the effective load capacity of the aforesaid springs.

Briefly described, my invention contemplates more or less automatic means for varying the effective load capacity of a spring or springs, this spring or springs being used either as a main supporting means or supplemental thereto.

Substantially all vehicles, including automobiles, carry varying loads over varying roads at varying speeds. Despite these varying conditions the effective load capacity of their springs remains constant and obviously the springs cannot operate or function at maximum efficiency.

Thus, it is one of the prime objects of the present invention to inventively create a mechanism, more or less automatic in its nature, by which the effective load capacity of the spring structure may be changed, even while the vehicle is in motion.

I am aware that prior devices for varying the flexibility of vehicle springs have been invented and have been used but I desire to explain that my device is greatly improved thereover inasmuch as it operates upon an entirely new principle, namely, the utilization of the upward travel of the weight being supported as a releasing means whereby the spring changing means may be slid to position.

That is, the upward motion of the car body and its occupants relieves the pressure upon the springs and consequently the abutment or the like which changes the effective length of the spring is free to move towards the spring whereby any play or lost motion between the spring and the said abutment is prevented. And, in this regard, it will be understood by those skilled in this art, that any play, however slight, is objectionable for several reasons. And, among these reasons, is that of noise. If there is any play, the noise is very objectionable.

As a matter of fact, any tendency toward play either when the car is new or later must be taken care of. And my construction will take care of this condition in good style because I utilize means whereby not only is any play prevented but there is a tendency towards keeping or maintaining a pressure between those parts at which play might tend to occur. In other words, I utilize a constant acting means for pushing the spring abutment, previously referred to, against the vehicle spring.

It will be apparent in my construction, which is readily understood as the description proceeds, that the bounces or upward rebounds of the vehicle or automobile relieve the pressure between the spring and the abutment thereagainst, but when this occurs the automatically acting take-up causes the abutment to follow the spring. In fact, it does more, not only causing a follow-up movement but also holding such follow-up movement against return movement until desired.

It will be understood that these prior art devices, which may be good for the purposes for which they are intended, are nevertheless lacking in this vital and material feature of preventing play and consequently rattle and clanging of the several spring parts occurs.

Another advantage resides in the particular means or mechanism which are used for controlling or regulating the several springs. This mechanism, due to its inherent arrangement, not only permits operation and control of the several adjustments while the car or vehicle is in motion but is quickly and easily operated by a minimum of power.

Another advantage of my invention lies in my follow-up means, this means contacting the spring to change its effective load capacity and then gradually tightening until all slack or play is eliminated and consequently the shock or noise due to the intermittent contacting of these two parts is practically eliminated.

Hand in hand with the aforesaid advantage lies the further advantage that release can be secured very easily despite the extremely tight connection which has just been set forth. This release may be secured by the spring-pulled release, operatable when the contacting load is eliminated as by rebound, lighter load, etc., or by means of my novel cam or toggle connections.

Another very material advantage of my invention resides in the improved riding qualities obtained thereby. That is, in a vehicle equipped with my invention, the springs can be adjusted to the several varying factors which are encountered and thus better riding qualities can be obtained.

Additionally, the general durability of the vehicle will be increased due to the lessening of the strains thereon. In other words, both the tires and the body will be longer lived.

My invention pertains to not only the above advantages but other objects and advantages reside in the special construction, combination and arrangement of the various elements forming the invention as more fully hereinafter claimed, reference being had to the accompanying drawings forming a part hereof, wherein, Fig. 1 is a side view illustrating my invention applied to either a main spring or to an auxiliary spring, parts being broken away in order to expedite the showing.

Fig. 5 is a sectional view taken along the plane of line 5—5 of Fig. 1, parts being partly broken away in order to render the showing clearer.

Fig. 6 is a view taken vertically through the supporting bracket as indicated by the line 6—6 of Fig. 1.

Fig. 13 is a side view, partly broken away, of the operating drum.

Fig. 14 is an enlarged sectional view illustrating the cable attaching means as schematically shown at the left of Fig. 13.

Fig. 15 is a side view of a modification showing the mounting at one end of a spring.

Fig. 16 is a partial top view of Fig. 15.

Fig. 17 is a side view showing the mounting of the opposite end of the spring.

Fig. 18 is a top view of the spring contact link and its associated parts.

Fig. 19 is a sectional view taken along the line 19—19 of Fig. 17.

Fig. 20 is a side view of a modified form of my invention, parts being broken away in order to expedite the showing.

Fig. 21 is a sectional view taken along the line 21—21 of Fig. 20.

Fig. 22 is a sectional view taken along the line 22—22 of Fig. 20.

Fig. 23 is a fragmentary plan view of the upper right part of the structure of Fig. 20.

Fig. 24 is a fragmentary sectional view taken along the line 24—24 of Fig. 20.

Fig. 25 is a side view of the sliding block through which the cable is threaded.

Fig. 26 is an end view of the sliding block shown in Fig. 25.

Similar numerals refer to similar parts throughout the several views.

One of the main uses of my device is its application in the automotive field but, of course, its use is not limited thereto. As illustrated in the accompanying drawings it may be attached between the axle of a vehicle and a frame bar.

Figure 1:
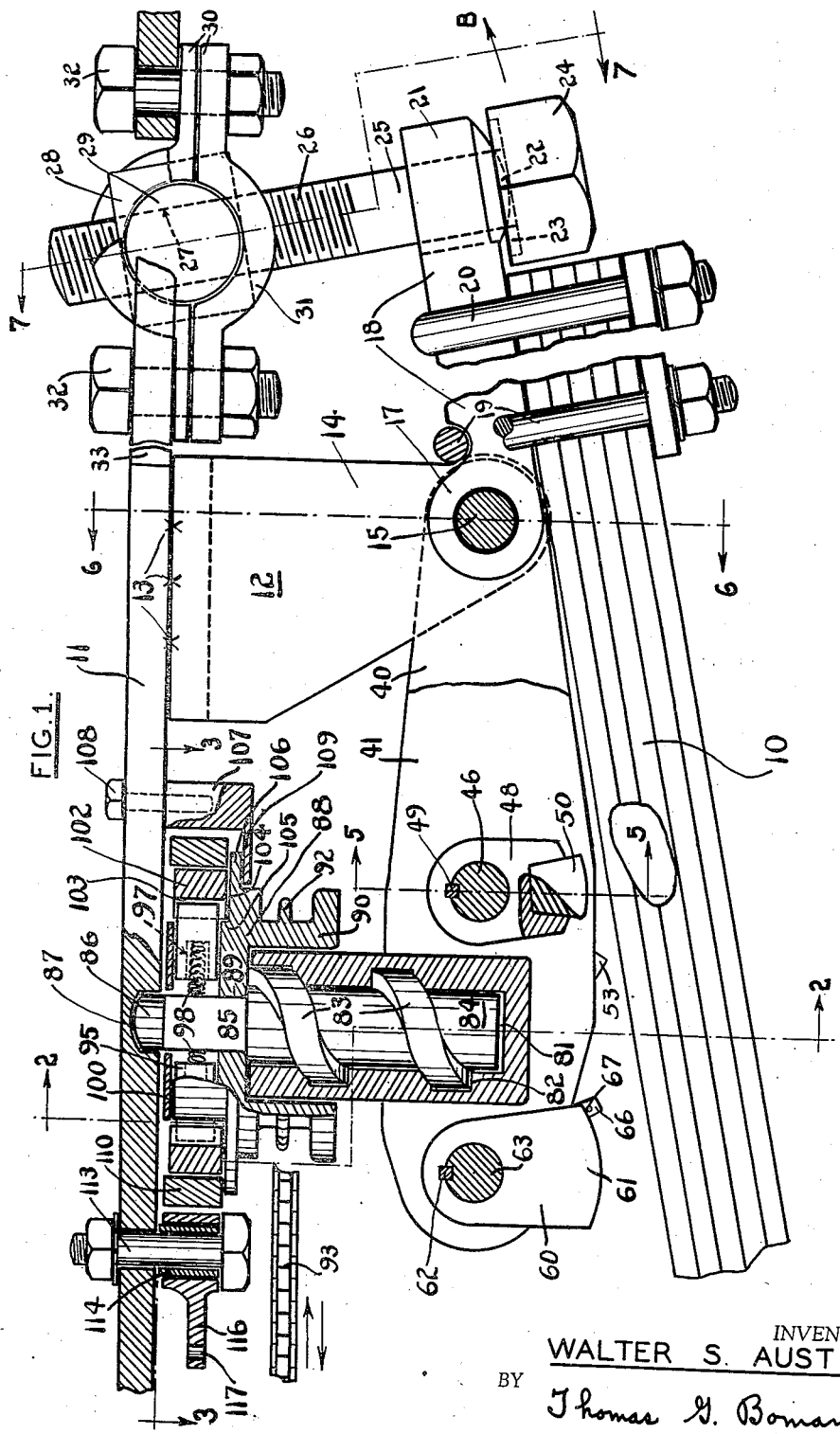

Numeral 10, see particularly Fig. 1, represents either an ordinary spring between or intermediate the axle and frame 11 of a vehicle or else an auxiliary spring located as aforesaid to supplement or augment the usual or desired springs. It is to be understood that the spring 10 is primarily supported by the wheels of the vehicle and is adapted to support the frame, except when used as an auxiliary spring, at varying effective loads.

Figure 27:
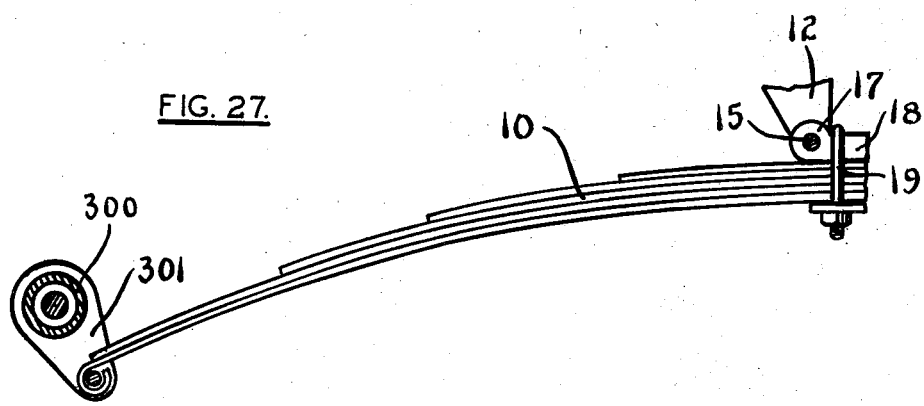
Fig. 27 is a view, more or less diagrammatic, showing both ends of the spring of Fig. 1 in attached relationship.

As shown in Fig. 27, the spring 10 has its large end attached to the bracket 12, which, in turn, is fastened to the frame 11, and the small end of the spring is attached to the axle housing 300 by the link 301.

The frame bar 11, see Fig. 6, has a bifurcated bracket 12 attached thereto as by welding at 13. The arms 14 of the bracket are bored or cored to receive the bolt 15, carrying the nut 16, therethrough. The head 17 of a block 18 is similarly bored to receive this same bolt between the arms 14. See Figs. 1 and 6. Thus the block is pivotally mounted upon this bolt and inasmuch as the spring proper is rigid therewith it is likewise pivotally mounted.

Figure 7:
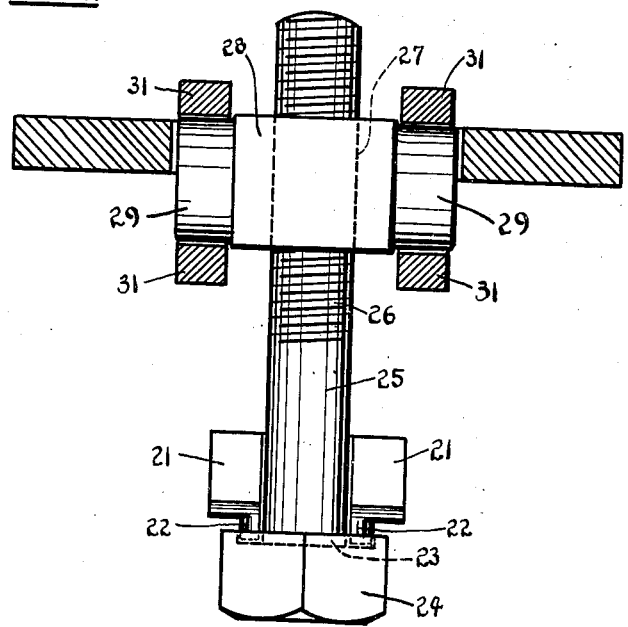
Fig. 7 is a sectional view taken substantially along the plane of line 7—7 of Fig. 1.

The block 18 has a flat lower surface against which the rear upper face of the butt end of the spring is laid and encircling U-bolts 19 and 20 hold these parts rigidly and tightly together. The other end of the block 18 is centrally recessed to form separated arms 21, see Figs. 1 and 7, and these arms have extensions 22, curved on their bottom and side portions as shown to fit into an annular groove 23 on the underside of the head 24 of the bolt 25. This bolt is threaded as at 26.

Figure 8:
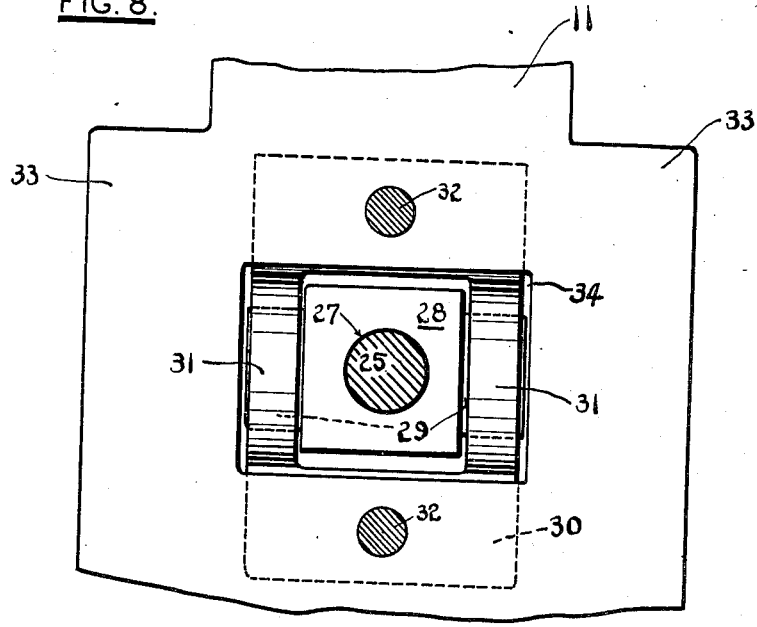
Fig. 8 is a plan view of Fig. 7, the several bolts being broken away.

This threaded end of the bolt is threaded into the threaded hole 27 of a trunnion member which comprises a central squared portion 28 and cylindrical ends 29. See Fig. 7. A bearing member, consisting of plates 30, see Fig. 8, having spaced journals 31, these journals receiving the ends 29 of the trunnion, is bolted underneath the chassis bar 11 by bolts 32. The frame bar is strengthened by being widened at 33 in order to permit the cut away portion at 34. This opening permits the upper parts of the journals 31, and the trunnion structure therebetween, to pass upwardly beyond the frame bar.

From the structure above described it will be understood that the spring 10 is mounted for controlled flexing or tensioning movement. That is, the bolt 25 may be rotated by means of a proper tool or connection thus either raising or lowering the tail end of the mounting block 18. If the bolt 25 is rotated so as to draw its head 24 upwardly then the spring is flexed so as to exert more or increased pressure between the base and the body yieldably supported thereon. Thus the body is more stiffly supported, or, explained another way, the automobile or vehicle is capable of receiving additional passengers or load. Oppositely, the spring is unflexed, and becomes more limber.

Again referring to Fig. 6, it will be seen that the bolt 15 also carries link bars 40 and 41 pivoted outside of the bracket arms 14. These link bars are of the shape shown in Fig. 1, and extend alongside of the spring. As shown in Fig. 5, the link 40 has a boss 42 extending inwardly and an opening 43 through both the boss and the link. Similarly, link 41 has a boss 44 and an opening 45. A shaft 46, headed at 47, extends through openings 43 and 45 and thus the links must move in unison.

A movable block or contact member 48 is of sufficient width to maintain the links in parallelism and is keyed to the shaft 46 at 49. As shown in Fig. 1, the contact member 48 is irregularly formed with a composition insert 50, possessed of some flexibility, for softening and quieting the contact with the spring 10.

The unheaded end of the shaft 46 receives the irregularly shaped member 51 which is keyed thereto at 52. See Figs. 4 and 5. The member 51 has an arm 53 extending downwardly with an opening 54 therein for receiving the operating cable 55. A pin 56 is grooved near its outer end to receive the end of a coiled spring 57. The arm 53 is shouldered at 58. This shoulder rides against a pin 59 in the link 41 to serve as a stop for the arm 53.

It will thus be understood that swinging movement of the arm 53 will be transmitted to the shaft 46 and in turn to the contact member 48. The spring 57 normally urges the shoulder 58 against the stop pin and when in this position the contact member is located as shown in Fig. 1. That is, ready for engagement against the top side of the top leaf of the spring. The contact member is swung sufficiently close to its center line so that any pressure caused by contact against the spring will not cause a release thereof.

A second contact member 60, having a downwardly extending portion or extension 61, is keyed at 62 onto the shaft 63. See Fig. 1. A collar member 64, similar to the member 51, has a key 65 to hold it rigid with the shaft and an arm 66.

The arm 66 has a hole 67 to receive the operating cable 68. A pin 69 is grooved for detachably receiving the other end of the spring 57 previously referred to. The arm is shouldered at 70 and a pin 71, located in the link 41, provides a stop against which this shoulder normally rests.

It will be understood that pulling upon the cables will rotate the respective contact members to horizontal positions whereby the spring 10 will not contact therewith during its operation. The cables lead to a convenient position, as, for instance, the instrument panel of an automobile, whereby they may be manually operated or controlled. When the tension on the cables or cable is released the action of the spring 57, see Fig. 4, causes them to return to a position ready for operation.

Figure 2:
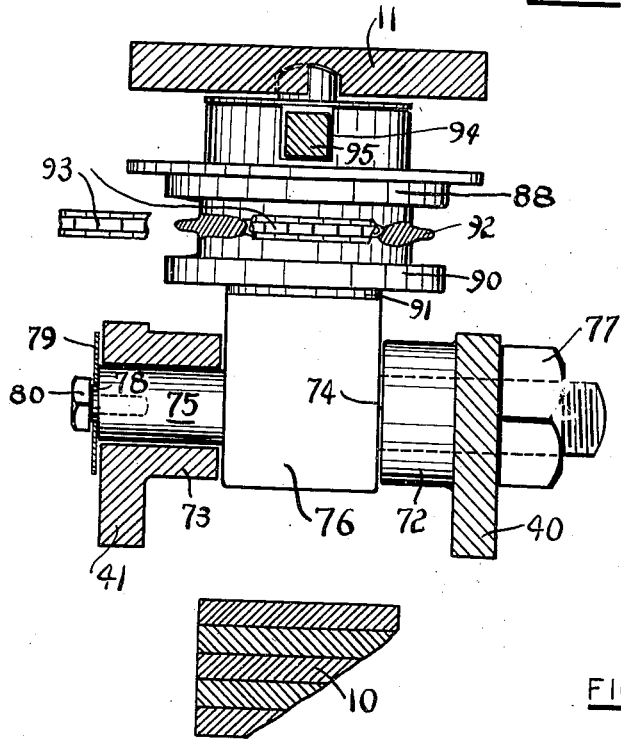
Fig. 2 is a sectional view taken along the plane of the line 2—2 of Fig. 1.

Referring now to Fig. 2, it will be noted that bosses 72 and 73 are respectively formed on links 40 and 41, and bored to rotatably receive the trunnions 74 and 75, respectively, of the cylinder 76. The trunnion 74 is threaded to receive the nut 77 while the trunnion 75 is shouldered at 78 to receive the washer 79 which is held in place by the stud 80.

The cylinder 76 is of square outer shape at its lower part. It is cored or recessed to form a cylinder 81, see Fig. 1, and has a helical groove 82 formed therein as shown.

A screw 84, having a thread 83, formed to fit the groove 82, has a squared top extension 85 which terminates in a cylindrical portion 86. This portion 86 seats in a correspondingly shaped seat 87 formed in the lower face of the chassis bar 11 and serves both as a thrust and radial bearing.

A drum 88 has a square opening 89 to receive the square extension 85 and rests on the shoulder therebelow. The drum has a skirt 90 which overhangs the upper part of the cylinder 76, the upper part of the cylinder being rounded to cylindrical form, as indicated at 91, in order that it may rotate within the overhanging drum 88, see Fig. 2, and a series of chain teeth 92 are formed thereon as shown. These teeth receive the operating chain 93.

The upper face of the drum 88 is diametrically slotted at right angles as at 94 to form four raceways for the sliding pawls 95, each of these having a pawl tooth 96 at its outer end and being recessed at 97 to house the coiled spring 98. The inner ends of these several springs ride against the flat faces of the top extension 85. A top plate 100, held by screws 101, covers the pawls. Two of these pawls are in engagement while the other two are medially positioned.

Figure 3:
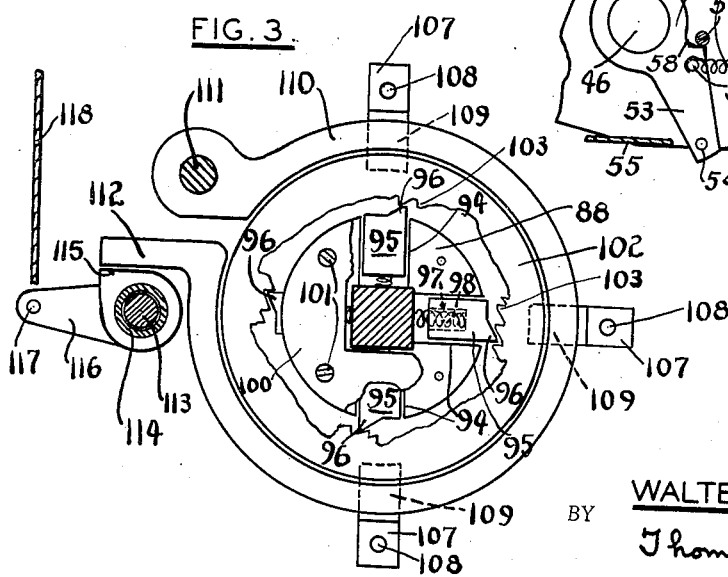
Fig. 3 is a view looking downwardly upon the releasing ring and its associated parts, this view being taken along the plane of the line 3—3 of Fig. 1.

An annular member 102 has ratchet teeth 103 which are engaged by the several pawls, see Fig. 3, and this ring rides upon the annular surface 104 of the drum 88. A shoulder 105 aids in maintaining this ring in concentric relationship to the several parts.

The drum 88 has an annular flange 106 extending as shown. Three L-shaped brackets 107 are bolted to the chassis bar 11 by bolts 108 and have horizontal arms 109 extending underneath the flange 106 to support the same. Thus the several parts are securely supported and held in operative relationship to each other.

A brake band 110 has one end pivoted on the stationary pivot 111 and the other end laterally extended at 112. A bolt 113, see Figs. 1 and 3, depends through the chassis bar 11 and a sleeve 114 is located thereabout and rigidly clamped against the chassis bar. A crank member is mounted on the sleeve for oscillation in the plane of the brake band. This crank has a cam face 115 formed thereon and an operating arm 116 is formed rigid therewith. A hole 117 near the end of this arm serves as a means for attaching an operating cable 118 thereto. A pull upon the cable 118 will cause action of the cam 115 against the arm 112 and a consequent tightening of the brake band. Thus the drum will be held against unscrewing movement. Release of the cable will permit the inherent springiness of the brake band to expand it away from the annular member 102. See Fig. 3.

The operating chain 93 for the drum 88, previously mentioned, is led therefrom to a sprocket gear 150 on a drum 151. See Fig. 13. This drum 151 may be revolvably mounted upon a frame cross bar by means of a shaft 152. The drum may be grooved more or less at 132 to receive the cable 153. As many grooves as needed or desired may be used.

Figure 9:
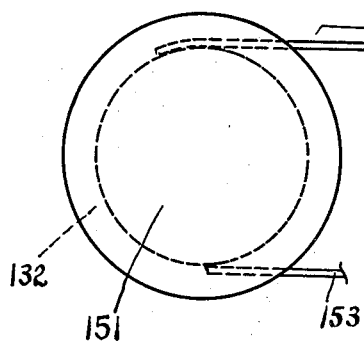
Fig. 9 is a more or less diagrammatic view illustrating the controlling and locking means.
Figure 10:
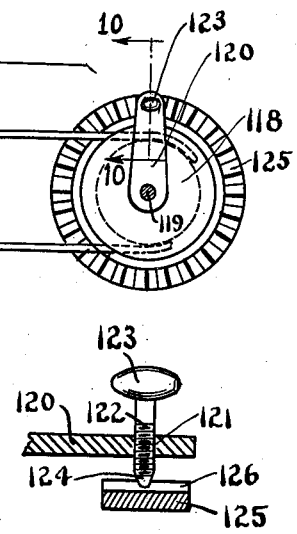
Fig. 10 is a sectional view taken along the plane of the line 10—10 of Fig. 9.
Figure 11:
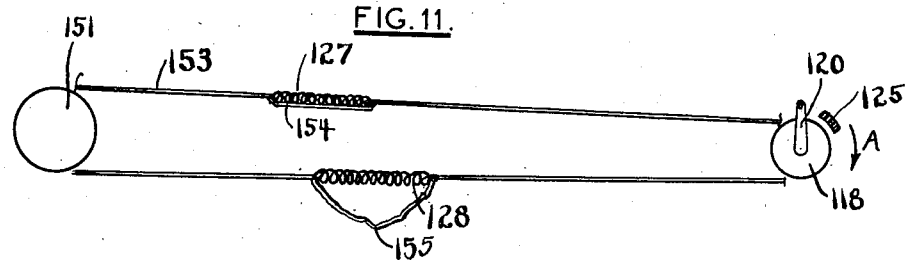
Fig. 11 is a diagrammatic view of the controlling means in its inoperative position.
Figure 12:
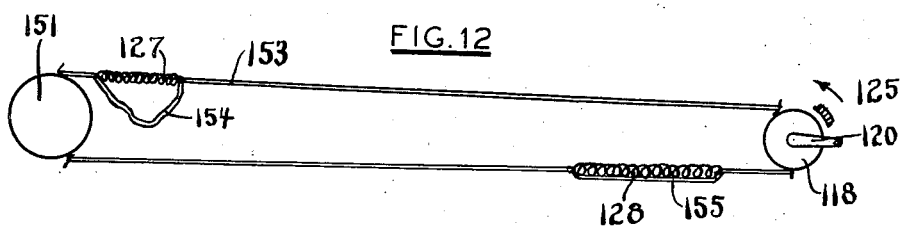
Fig. 12 is a diagrammatic view of the control means in one of its operative positions.

A pulley or drum 118, see Figs. 9, 11 and 12, may be provided to receive the cable 153. This drum is rotatable upon a shaft 119 by means of a crank 120. The outer end of the crank, see Fig. 10, has a threaded hole 121 to receive the threaded stem 122 of the handle. The handle 123 is of oval shape whereby it may be easily turned to move the point 124 toward or away from the locking teeth 126 on the annular stationary locking ring 125.

As shown in Fig. 11 a relatively heavy spring 127 is inserted between two points on the cable so as to permit the cable to have slack therein as shown. Similarly, a light spring 128 is placed upon the opposite side of the arrangement.

The cable 153 encircles each of the drums as many times as necessary and, as shown in Fig. 14, the drum 151 is cut away adjacent the medial portion of the groove and a clamping bar 133 positioned as shown. A stud 134 extends through the clamping bar and tightly clamps the same and the lower portion of the groove. If desired, the other drum 118 may have the cable similarly attached thereto.

This cable may be connected to and operated by any mechanical or electrical power device as may be desired.

The operation of the form of my invention just described is readily understood. When the crank 120, see Figs. 9-12, is turned in one direction, this causes the drum 88 to rotate and this also turns the screw 83 attached thereto and this operation lifts the cylinder 76. This is the position in which it is shown in Fig. 1.

Correspondingly, Fig. 11 indicates that movement of the handle in the direction indicated by the arrow A has caused the above positioning of the cylinder and its dependent pawl structure. Also, the rotation of the handle has been continued beyond the position needed to merely contract the parts and thus the spring 127 has been tensioned as desired. The extension of the spring 127 is limited by the portion 154 of the cable 153.

Figure 4:
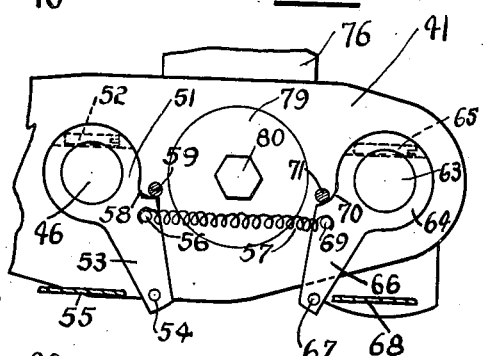
Fig. 4 is a fragmentary side view of the free end of the swinging links, looking from the rear side of Fig. 1.

The manipulation just described maintains the linkage carrying the swinging blocks in its upper or inoperative position at all times, taking care of any lost motion or slack which might somehow occur in the lifting mechanism. When in this position the blocks will not be contacted by the spring when the vehicle is not in movement and the car is carrying only a light load. However, the cables 55 and 68, see Fig. 4, provide means for swinging the blocks horizontally whereby no contact will be had between them and the spring even when the car is carrying its heavier load as the clearance provides for a full free movement of the springs.

And, of course, the blocks can be released by their respective cables, the spring 57 functioning to return them to their positions as shown in Fig. 1, when the car is stationary and carrying its light load. Additionally, the design is such that these blocks may swing to an operative position even when the car is carrying its heavy load.

The bolt 25 may be shortened to thereby stiffen the spring and thus the same will take care of a heavier load. Or, the bolt may be loosened and entirely disengaged by swinging outwardly and upwardly as indicated by the arrow B. It can be fastened in its upper position whenever desired. This swinging movement is permitted by the upper end trunnion mounting as previously explained, this type of mounting also taking care of any turning which occurs during the adjustment of this bolt.

Assume now that a materially heavier load in the car occurs. Then the spring approaches the blocks and upon turning of the drum and screw 83, by means of the cable control through the drum 151, the blocks move downwardly to contact the top of this spring.

As previously stated, the several parts are so arranged and adjusted as to permit either or both of the contact blocks to swing to and from their operative position or positions, as shown in Fig. 1, even when the car is loaded to its normal heavy load.

It is to be understood that the block 48 is longer in effect than the block 60 and that consequently it engages the spring before the block 60. This prior engagement stiffens the spring somewhat while the latter engagement additionally stiffens the spring. Thus the spring is gradually stiffened and this gives a smooth action substantially free from shocks. Additionally, the bolt 25 can be adjusted to contact the spring prior to the engagement of the first block.

It will be understood that the above description refers to a condition wherein the several blocks are out of contact with the spring under the chosen load. However, if it is desirable to strengthen the spring for the load which must be carried and to let the spring remain in this stiffened condition, then this is done by rotating the handle 120, see Fig. 12, to a position as shown wherein the screw 84 has been instrumental in causing the cylinder 76, and its associated blocks, to move downwardly more or less.

In case the vehicle already carries a heavy load, this makes no difference inasmuch as the spring 128 will be tensioned by the measured turning movement and be available to rotate the telescoping parts as soon as the blocks are released. Or, continued turning of crank 120 lengthens the spring 128 until the power is directly transmitted through the portion 155 of the cable 153. This release will occur more or less gradually as the several springs expand and contract during use. That is, after the vehicle has started, the rebounds thereof will permit this follow-up movement to occur until the desired positioning of the several blocks is had.

When it is desired to unlock or release the contacting members the handle 120 may be turned so as to properly turn the drum to accomplish this. However, in case it was necessary or desirable to lock the ratchet ring 102 by the brake band 116, in order to prevent or tend to prevent reverse movement of the blocks upwardly, then it is again necessary to release this brake band by releasing the cable 118. See Fig. 3.

It will be understood that it is not always necessary or essential that the brake band and its appurtenant structure be used. Also, if desired, the threads forming the screw connection between the frame bar and the linkage may be cut to a lesser pitch whereby it can be more easily operated. In this case, if desired, the drum carrying the sprocket teeth may be operated through suitable gearing as desired by an electric motor.

It is desired to explain that the structure herein described can be used in combination with all types of springs and needs to be only changed by a mechanic in the art to fit the particular situation in question.

*Another form of my invention*

Figure 28:
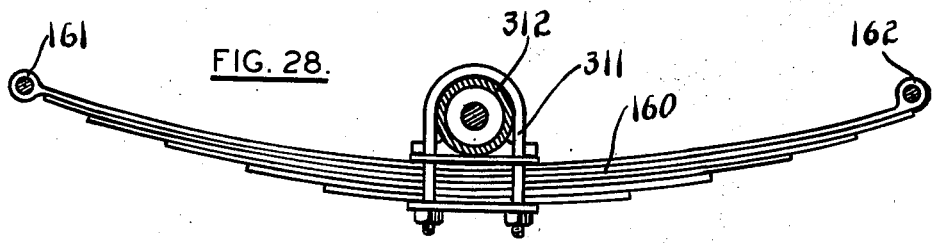
Fig. 28 is a full length view of the spring shown partially in Figs. 15 and 17.

Referring now to Figs. 15 to 19, inclusive, 160 indicates a spring having looped ends 161 and 162. As shown in Fig. 28, the intermediate portion of the spring 160 is attached by means of the connection 311 onto the axle housing 312. As shown in Figs. 15 and 16, the coiled end 161 encircles the pivot pin 163 which passes through the arms 164 of block 165. The other end of the block 165 is formed to carry the pivot 166, this pivot passing through the lower ends of the bracket members 167. Fastening means 168 attach these brackets in spaced parallelism upon the supporting or chassis member 169.

The block 165 carries a strip member 170 affixed in contact with its top face by rivets 171 and this strip extends between the brackets and is reversely curved at its free end as shown. A cushioning or abutment member 172, formed of resilient material, shown partly broken away, is located between the frame member 169 and the block 165.

From the above description it will be understood that the end of the spring encircling the pivot pin 163 can move vertically whenever necessary. However, the curved rearward extension of the strip 170 contacts the underside of the member 169, as shown in dotted lines, to prevent any unnecessary downward movement.

The outer surface of the end 161 of the spring 160 is adapted to receive the large curved end 174 of the member 175. The other end of the member is curved to form the journal 176. It will thus be understood that the member can oscillate to a limited extent about the geometrical center of its large end 174. This member 175 eases the contact against the main spring 160.

The end of the eye 177 limits movement in one direction and the surface 178 contacts the spring to limit movement in the other direction. The surface 178 is curved very slightly, its curvature in the drawing being exaggerated for clarity, and this prevents any shock from occurring whenever these two parts come or ride together.

A control lever 179 has spaced arms 180 which straddle the end 176 of the cam member and a suitable pivot 181 extends through these several members as shown. Thus a pivotal connection is had therebetween. The upper part of the control lever has a short arm 182 and a longer arm 183 with a pivot shaft 184 therebetween to revolubly receive the roller 185. Holes 186 and 187 are provided near the top end of this control lever for means to connect the control cable 188 and control spring 189, respectively.

A track member 190 is attached to a stationary part of the frame by means of bolts 191 and a track 192 is formed thereon, this track receiving the roller 185. As shown, the track is eccentrically formed with respect to the pivot 181 whereby movement of the roller 185 from its dotted line position, see Fig. 15, to the right, will gradually cause a downward movement of the cam member 175 to occur and thus the spring 160 will be in contact with the surface 178. The movement of the control lever 179, carrying the roller 185, is limited by the stop pin 193.

It is to be understood that the roller 185 may assume the extreme left hand dotted position and when in this position the spring 160 is free to operate under normal conditions even though it carries a heavy load. In other words, the roller 185 may be completely withdrawn so as to avoid any interference with the spring.

The other end of the spring 160, indicated by reference numeral 162 and previously referred to, encircles the pivot pin 200. Links 201 and 202 are pivotally mounted upon the pin 200 immediately adjacent the spring end 162, and these links extend upwardly to opposite sides of the plate 204, being pivoted thereto at 203.

The plate 204 is pivoted between the depending arms of the bracket 205 by a pin 206. The bracket is suitably carried by the frame or chassis member 11. As shown in partly broken away section, a cushion abutment 208 is inlaid in the plate member so as to contact the top of the eye 162.

It will be understood that the weight of the car or the like will cause the cushion member 208 to rest firmly upon the pivot therebelow and thus the links 201 and 202 will not turn or oscillate about the pivot 203 but rather about the pivot 206 whenever the main spring 160 is stressed and consequently changed more or less in length.

A cam or contact member 210, inlaid at 209 with resilient material, has spaced arms 211 pivotally received upon the pivot pin 200. It has an extension 212 at its opposite end, this extension carrying a pin 213 which receives the arms 214 of the lower toggle arm 215. This toggle arm 215 carries a pivot 217 at its upper end which pivot serves as a shaft for the upper toggle arm or member 218. This upper toggle member comprises spaced links connected by an integral portion 216, shown in dotted lines in Fig. 17. This portion 216 serves to prevent this toggle connection from folding rearwardly upon itself.

A pin 219 extends from the bottom part of the upper toggle member and an operating cable 220 is attached thereto. A pull upon this cable as shown by the arrow designated R breaks the toggle.

The upper ends of the links of the upper toggle member 218 are pivoted upon a pivot pin 221, this pivot carrying the link 222. This link is bifurcated at its other end. It is made up of three sections, one section, having an enlarged portion 223 for contact with the control block 225, lying between and being riveted at 224 to the spaced rear arms. These arms pivot upon the pin 206, previously mentioned, exteriorly of the bracket 205.

The block 225 has a cam surface 226 which engages against the enlarged portion 223 on the link 222 and thus pushes the almost straightened toggle mechanism downwardly to cause the cam member 210 to ride against the top of the spring. It is to be noted that the pivot pin 217 lies to the front of a line between pivots 213 and 221 and thus there is a slight tendency for the toggle mechanism to unfold. However, a spring 234, fastened at 235 to the link 215 and to the plate 204 at 236, causes the toggle mechanism to remain in its position as shown in Fig. 17. In other words, the central part or pivot of the toggle is close enough to the straight line position thereof to prevent any buckling tendency when the pull of the spring is had thereagainst. This makes for a toggle which is easily released.

As shown in Fig. 19, the supporting member 207 has a sheet metal guide 227 welded thereto at 228. Inturned flanges 229 are formed as shown to ride under and support the ribs 230 on the sliding block 225. As shown in Fig. 17, the sliding block carries a pin 231 for an operating cable 232. Thus the block may be pulled as indicated by the arrow S. A control or retraction spring 233 also is attached to the pin 231 and to a stationary pin (not shown). The spring 233 tends to draw the block to its full operative position. The limits of movement of the block are shown in dotted lines.

The spring 233 causes the cam surface 226 to ride against the toggle, this in turn causing a downward movement of the toggle and also the curved or cam member 210. This occurs inasmuch as the spring 160 alternatively moves up and down due to the varying of the load thereon and the spring 233 is effective upon the rebounds until it has caused full and complete movement of the cam member downwardly. The slant of the surface 226 is such as to prevent the upward thrust upon the toggle from causing sliding movement of the sliding block.

As stated, pulling upon the cable 232 causes release of the several parts to permit upward movement thereof. Also, the other cable 220 may may be pulled in order to completely break the toggle mechanism and thus give a very quick release with a consequent movement of the several parts to positions entirely out of the way.

*A basic form of my invention and its operation*

Referring to Figs. 20–26, inclusive, numeral 250 indicates a spring which has the end shown held firmly together by the bolts 251, see Figs. 20 and 23, these bolts passing through one end of the housing bracket 252.

The bracket 252 has perforated ears 253 to receive the said bolts 251 and immediately adjacent this construction is an integrally formed boss 254 which is journalled for the main supporting pin 255 which is suitably supported by the bracket 256. See Fig. 20.

The boss 254 is cut away at 257, as by kerfing with a circular saw, and an annular sheave 258 is located in the said kerf, being adapted to carry an operating cable 259 and to revolve about the pin 255. The walls of the kerf aid in forming the channel groove for the cable. See Fig. 22.

The bracket member has depending walls 260 which extend downwardly alongside of the main spring 250 and aid in maintaining its leaves in alinement. These walls extend along the spring as shown and are joined at their upper edges by a web 261, see Fig. 20, this web being spaced upwardly from the upper leaf of the spring to serve to provide a space for the sliding movement of the block 262. The block is grooved and bored as at 263 to fixedly receive the cable 259.

A second block 271, this block being located as shown whereby it serves to hold the web 261 in the previously mentioned spaced relationship with respect to the upper bearing leaf, is cut away to permit passage of the cable along its top and around the sheave 258.

The other end of the cable is fastened to the spring 265 at 266 and this spring 265 tends to retract the sliding block 262 to the position as shown in Fig. 20. Pulling movement may be exerted upon the cable 259 by the operator as indicated by the arrow M and thus the block can be moved to any adjusted position as desired.

The open end of the sliding block space may be closed by a rubber closure plate 267 held in place by studs 268 wired together at 269 to prevent turning thereof. A small slot 270 permits passage of the cable 259.

The lower part of the walls 260 receive the cross bolt 272, headed at 273 and cross grooved at 274. The cross groove receives a pin 275 which passes through the terminal ends of encircling arms on the segmental cam disc 276. Thus the disc is rigidly attached to the pin 272.

A supporting bracket 277, mounted on the frame bar 11 see Figs. 20 and 21, revolubly carries a shaft 278 which is enlarged at 279, has a camming surface 280 and annular gear teeth 281 located between the arms of the bracket, a drum 282 keyed thereto, a washer 283 adjacent the drum and a key 284 holding the several parts onto the shaft. As shown, the shaft 278 may be continued at 285 to another unit thus giving means for simultaneous operation of the units.

The drum 282 receives an operating cable which extends as desired from the drum to rotate the same in either direction, the cable being equipped with a locking device as desired. Or, if desired, a pawl and ratchet mechanism can work directly on the gear segment. The operating cable can be connected to and operated by any suitable electrical or mechanical power device even when the vehicle is in motion.

The cam disc 276 has a gear segment 286 with teeth 287 attached thereto by rivets 288, a spacer 289 being positioned therebetween. These gear teeth mesh with the annular gear 281.

The cam disc 276 also has a spring 290 attached thereto at 291 so as to pull it in the direction indicated by the arrow N. A cable 292, attached at 293, may be pulled in the direction of the arrow O to cause release of the cam disc.

Figure 29:
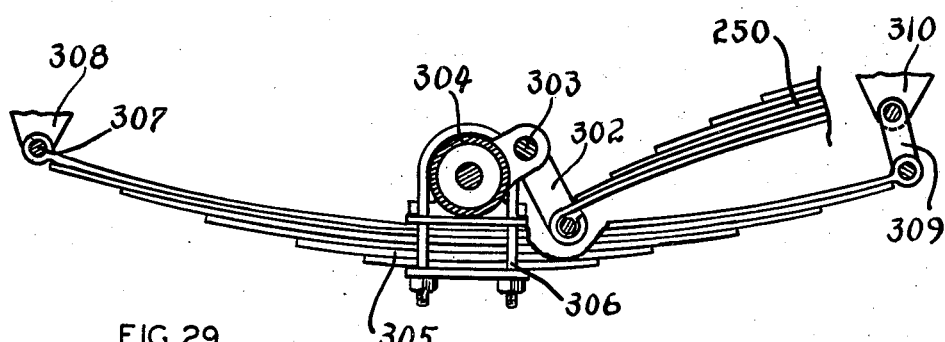
Fig. 29 is a view, similar to Fig. 27, showing the spring of Fig. 20 in associated relationship.

As shown in Fig. 29, a link 302 pivotally carries the small end of the spring 250. The link 302 is pivoted onto the axle housing 304 as at 303. A car spring 305 is intermediately fastened at 306 onto the axle housing and has one end 307 carried by the frame by means of a bracket 308 and the other end is linked by the link 309 onto a bracket 310 which is also rigid with the frame.

In operation, the sliding block is slid outwardly towards the open end of its space, the farther out that it is slid, the greater its effect upon the spring 250. Next, the cam disc 276 is swung upwardly so that its upper edge contacts the surface 280 on the shaft 278. The edge of this disc is designated 294 and is concentric about the point P. Thus it will be understood that this edge acts in the nature of a wedge.

After it engages the shaft, the spring 290 will be effective to carry the disc farther into engagement as the spring vibrates during use. Or, if desired, the cable 295 may be operated to positively pull the cam disc to its desired position.

Also, if desired, the shaft 285 may be extended to a plurality of units. Similarly, as many units may be used as are deemed necessary or desirable. For instance, as on a bus, a number of units may be utilized across the bus.

It is also to be understood that the block member 252 can be extended similarly to the member 18 of Fig. 1 and equipped with a similar bolt adjustment 25. No showing of such is made in order to prevent duplication.

In order to shorten and clarify the specification and claims I have used the term "axle" as including such other parts and extensions as are, or may be, more or less, rigidly supported by the wheels. Likewise, the term frame is very comprehensive. It includes the body and such other parts and extensions, as are, more or less, rigidly connected therewith or even flexibly supported by the intermediate springs.

It will be understood that I have shown three examples of my construction. Broadly, these are illustrated in Figs. 1, Figs. 16 and 17, and Fig. 20. The effective length of the spring 250, shown in Fig. 20, starts at the outer or left hand end of the sliding block 262. The effective length of the spring 160, Figs. 16 and 17, is substantially between the pivots 181 and 213 when both devices are in operation. Otherwise, the effective length may be varied as is obvious. In Fig. 1, the effective length starts from the block which is in contact.

In conclusion, it will be understood that my invention resides primarily in a practical structure, which may be operated even when the car is in motion, whereby the flexibility of the springs of the car may be changed.

And not only is the flexibility changed but the means for so doing, the abutments, are caused to keep contact with the spring whereby noise is eliminated.

In constructions of this kind it will be understood that even a slight space between the abutments and the spring would permit a play which would be extremely noisy and, from a practical standpoint, substantially worthless.

By my novel take-up means I eliminate all of the play and thus obtain a snug fit between these abutments and the spring and there is no rattle or bang or objectionable noises during operation and use of my device.

From the above description it will be appreciated that my invention is not a shock absorber in any sense of the word but is a novel type of suspension which is easily controlled at the will of the operator even during movement of the car. The load capacity of the spring is varied to suit the different conditions and thus the many recited advantages are attained.

I claim:

1. In a spring suspension for vehicles, the combination of, an axle, a frame, an intermediate spring, contacts between the frame and the spring, means for releasing the contacts from the said spring, said means including as one of its elements a pivoted contact adjustably mounted which may be swingably disengaged or bodily withdrawn out of engagement with the spring.

2. In combination, a frame of an automobile or vehicle adapted to be yieldably supported, a bracket thereon, one end of a supporting leaf spring located adjacent to said bracket, means for fastening the spring to the said bracket and an abutment movable against the spring and spring means for urging the abutment to contact the spring.

3. A combination of elements as set forth in claim 2 but also characterized by the fact that said fastening means is provided for so mounting the said leaf spring as to permit a limited degree of oscillation about its fastening means, and additional fastening means for turning the spring about said pivot to flex the same.

4. In a combination of the class described, a leaf spring having one end pivoted to a frame, a link swingable about the said pivot between the frame and the spring, abutment means on the link in opposed relation to the spring, means for causing the said link to approach the spring whereby the abutment tends to follow the said spring and means for preventing return movement of the abutment means.

5. In a spring suspension, the combination of, an axle housing, a leaf spring having one end cooperatively associated with said axle housing, a frame, pivotal means for attaching the other end of the spring to said frame, means for flexing the spring by rotating the same about said pivot, and extendable means fastened to the frame so as to contact the spring intermediate its ends upon extension thereof.

6. A combination of elements as recited in claim 5 in which said flexing means comprises an extension in line with the spring, and adjustable means located between the same and the frame.

7. A combination of elements as set forth in claim 5 in which said flexing means comprises an extension in line with the spring, and adjustable means located between the same and the frame, said adjustable means having a pivotal connection between the same and the frame for the purpose described.

8. In combination with a spring flexed by the extension of a screw within a fixed grooved cylinder, of means for locking the screw against rotation and additional means for holding them under twisting strain.

9. In a spring suspension for vehicles, the combination of, an axle, a frame, an intermediate spring, movable contact means between the frame and the spring, means for pushing the movable contact means against the spring whereby said contact means can be caused to automatically follow the rebound of said spring and for causing the movable contact means to remain in contact with the spring during the rebound of said spring and for holding the contact means in its contacting position against return movement and releasing means for releasing the said last mentioned means.

10. A combination of elements as set forth in claim 9 in which the releasing means consists of two sets of releasing means located in series.

WALTER S. AUSTIN.